UNITED STATES PATENT OFFICE.

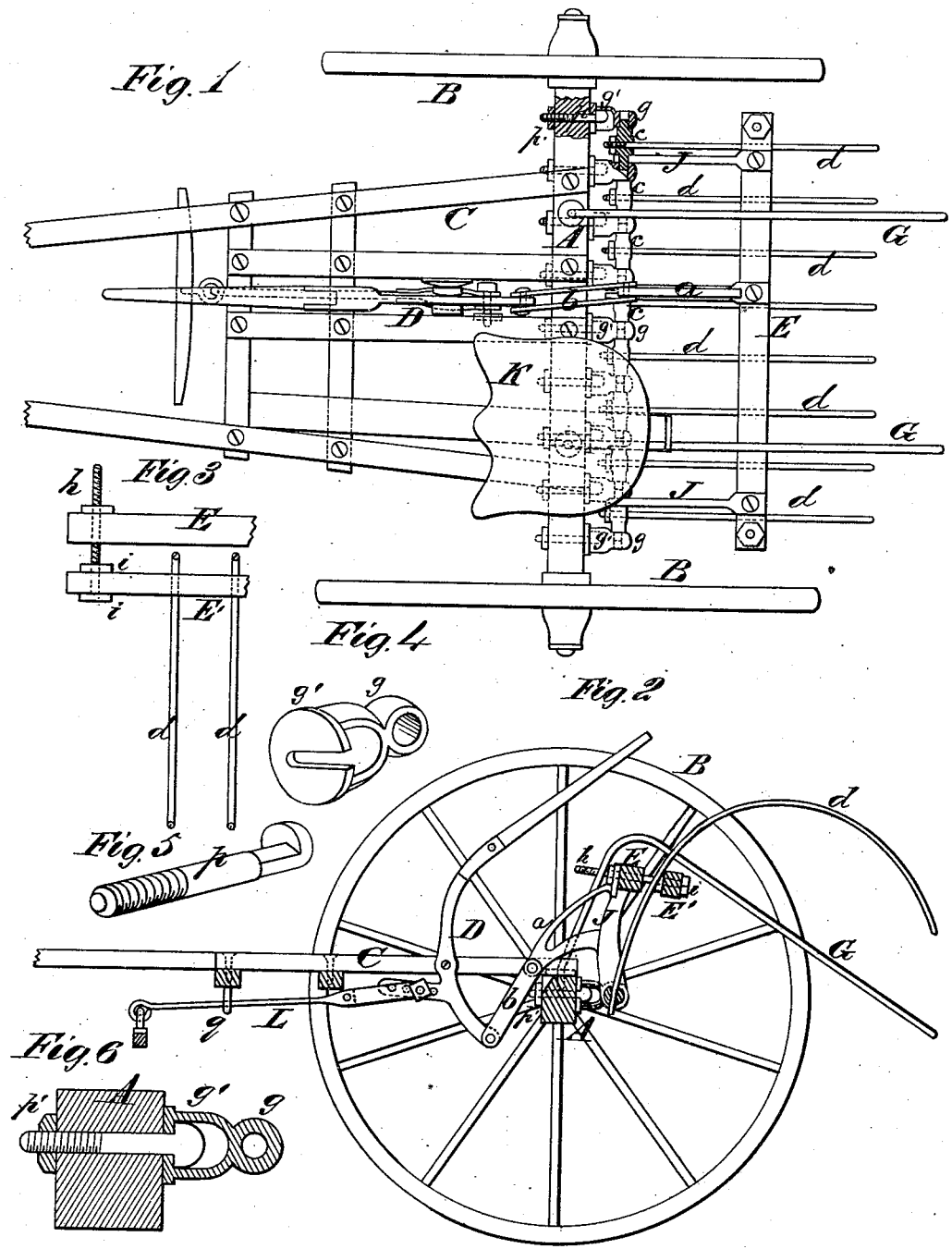

ROBERT WILSON, OF ITHACA, NEW YORK.

IMPROVEMENT IN HORSE HAY-RAKES.

Specification forming part of Letters Patent No. 164,356, dated June 8, 1875; application filed May 7, 1875.

*To all whom it may concern:*

Be it known that I, ROBERT WILSON, of Ithaca, in the county of Tompkins and State of New York, have invented a new and valuable Improvement in Horse Hay-Rakes; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a plan view of my horse hay-rake; and Fig. 2 is a longitudinal vertical sectional view of the same. Figs. 3, 4, 5, and 6 are detail views.

This invention has relation to horse hay-rakes; and it consists in so uniting the holding-down and lifting bars, between which the teeth pass, that the teeth can be adjusted so that their raking ends will run at any desired height from the ground. It also consists in angular clearing-teeth, which extend over the lifting-bar, and are inclined backward and downward, so as to pass between the rake-teeth when raised, and clear the teeth of the gathered load. It also consists in eye-brackets having slotted cup-shaped vases adapted to receive the heads and angular necks of bolts which secure them to the axle, as will be hereinafter explained.

In the annexed drawings, A designates the axle of two transporting-wheels, B B; and C is the draft-frame, which is rigidly secured to and extended forward of the axle. To the frame C a three-pronged lever, D, is pivoted, which is connected to a lever, $a$, by means of a link, $b$. The lever $a$ has its fulcrum on an oscillating head, $c$, of one of the rake-teeth $d$, and to the rear end of this lever $a$ a holding-down bar, E, is rigidly secured. When the lever D is thrown forward the rake-teeth will be held down in working position. The lever D and its connections are constructed substantially as described in my Letters Patent No. 156,005. The upper ends of the rake-teeth $d$ are made square in cross-section, and are also made wedging. These ends of the teeth are passed through the heads $c$ at the middle of their length, and rigidly secured by means of nuts or by riveting. The rounded extremities of each head $c$ has its bearings in two eye-brackets, $g$, which are rigidly but removably secured to the axle A. The brackets $g$ have broad hollow bases $g'$, with slots in their bottoms and openings in their sides, as shown in Fig. 4. These brackets are applied to the back of the axle A, and rigidly secured thereto by means of screw-bolts $p$ and nuts $p'$. The heads of the bolts $p$ are eccentrically formed on flattened shanks, and are received into the hollow bases of the brackets, as shown in Fig. 6. By simply loosening the nuts $p'$, the brackets $g$ can be detached from the axle. The bar E, which is used for holding the rake-teeth down to their work, has connected to it a bar, E', which raises the teeth when lever D is thrown upward. The connection between the two bars E E' is made by means of two screws, $h$ $h$, each one of which is secured to the bar E by means of two nuts, $i\ i$. I am thus able, by adjusting the bar E', to have the points of the rake-teeth at any desired distance from the ground when they are in working position. This adjustment is necessary in order to adapt the machine to the different heights of animals, and to the work of raking generally. G G designate clearers, which strip the gathered load from the rake-teeth when the latter are raised. The form of each clearer G is that of an acute angle, the shortest arm being secured to the axle A, from which it rises a short distance. The longest limb extends backward and downward, and above the rake-teeth when they are in raking position, and between and below the teeth when they are raised. These clearers work to a much better advantage in cleaning the rake-teeth than the well-known horizontal clearers. J J designate arms, which pivot the bar E to the heads $c\ c$ at the extremities of the axle. K designates the driver's seat, and L is a draft-bar, which is pivoted to one of the limbs of lever D, and which passes through an eye, $q$, and has a single-tree attached to its front end.

What I claim as new, and desire to secure by Letters Patent, is—

1. The holding-down bar E and the adjustable under bar E' in combination with the raking-teeth, whereby the raking ends of the teeth can be adjusted and set at any desired height from the ground, substantially as described.

2. Angular clearing-teeth G projecting above the axle of the rake, then extending backward and downward over the bars E E', substantially as described.

3. The eye-brackets $g$ formed with hollow slotted bases $g'$, as and for the purposes set forth.

In testimony that I claim the above I have hereunto subscribed my name in the presence of two witnesses.

ROBERT WILSON.

Witnesses:
 O. P. HYDE,
 JAY B. KLINE.